March 8, 1949.     R. G. SANDS     2,463,718
PROTECTIVE DEVICE
Filed Sept. 18, 1944
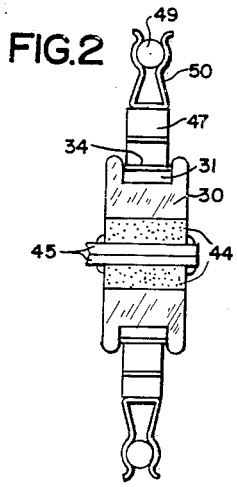
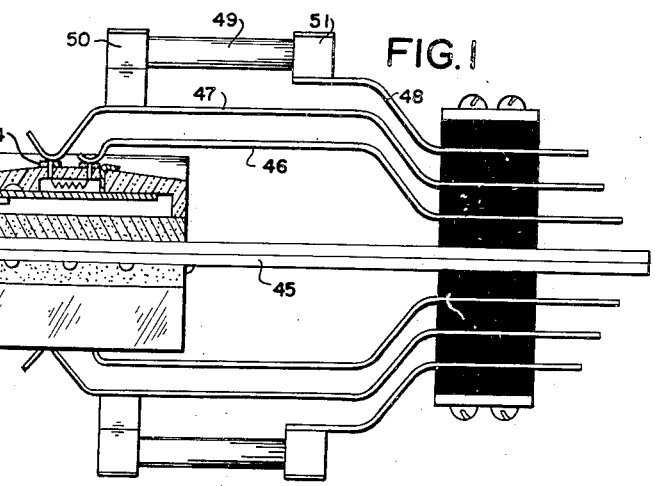
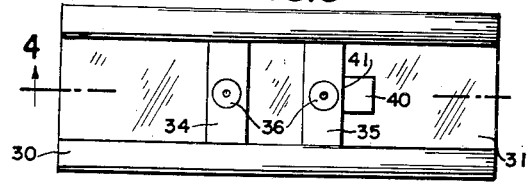
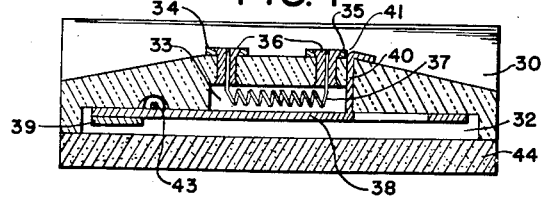
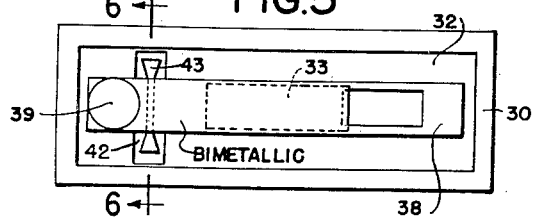
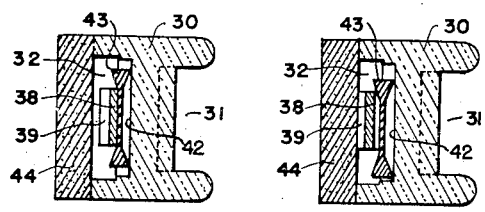
*INVENTOR.*
ROY G. SANDS
BY
*Chas. Tu. Candy.*
ATTORNEY

Patented Mar. 8, 1949

2,463,718

UNITED STATES PATENT OFFICE 2,463,718

PROTECTIVE DEVICE

Roy G. Sands, Waukegan, Ill., assignor to Automatic Electric Laboratories, Inc., Chicago, Ill., a corporation of Delaware Application September 18, 1944, Serial No. 554,559

6 Claims. (Cl. 200—115)

The present invention relates in general to protective devices for electrical circuits and more particularly to arresters for protecting telephone circuits from lightning discharges and other abnormal current or voltage conditions.

It is the object of the invention to provide an economical, efficient and reliable device for protecting such circuits from injury due to overvoltages occurring, for instance, as the result of lightning, or as the result of surges induced from adjacent circuits, or as the result of crosses between adjoining circuits. A further object is to protect the electrical equipment against injury from over-currents, or what are commonly known as "sneak" currents, resulting from accidental crosses or resistive leaks between adjoining circuits.

A feature of the invention is a new and improved thermal protector block. Another feature resides in an arrangement for heating a thermal element to cause it to assume a certain position and then mechanically locking it in that position to cause it to remain there after the source of heat has been removed. Other objects and features will be clear from the following specification taken in connection with the annexed drawings, in which Fig. 1 is a plan view of the mounting arrangement for a pair of protective devices, one of the devices being shown in cross-section, Fig. 2 is an end view of the protective devices and mounting arrangement shown in Fig. 1, Fig. 3 is an enlarged view of one side of the protective device, Fig. 4 is a sectional view taken along the line 4—4 of Fig. 3, Fig. 5 is a view of the opposite side of the protective device shown in Fig. 3, with the carbon block removed, Figs. 6 and 7 are sectional views taken along the line 6—6 of Fig. 5, Fig. 6 showing the gravity locking pin in its normal position, and Fig. 7 showing the pin in its operated position.

Referring now to Figs. 3 to 7, inclusive, these show a preferred form of protector. Here the protector framework comprises a porcelain block 30 having a wide groove or slot 31 on one side. On the opposite side is a shallow recess 32 at the center of which is a further recess 33. A pair of spaced-apart metallic terminals 34 and 35 disposed in the groove 31 are rigidly fastened to the block by means of small hollow rivets 36 extending through the block into recess 33. Within the recess 33 is a heat coil 37, whose two ends are inserted into the openings of the rivets and soldered thereto. Laying flat upon the bottom of recess 32 so that it covers the recess 33 is a bi-metallic member 38. A precious metal contact 39 is carried by this member at one end. Lug 40, formed of metal punched out of the body of member 38, is bent over at right angles thereto and extends upwardly into the recess 33 and through a further small opening in the porcelain block to a point adjacent terminal 35, where its free end is bent over to securely maintain the bi-metallic member in place. At 41, the lug is soldered to terminal 35.

Underneath the bi-metallic member and near the end thereof which carries contact 39 is a recess 42 in the porcelain block. Disposed in this recess is a gravity locking pin 43, whose central portion is of uniform cross-section and whose ends are flared generally in the shape of truncated cones. The function of this pin will be explained presently.

The protector is placed in service by covering recess 32 with a block 44 of carbon or graphite and, as shown in Figs. 1 and 2, inserting the two between mounting plate 45 and a pair of flexible contact springs 46 and 47, so that the springs engage terminals 34 and 35. A fuse 49 is mounted in appropriate clips 50 and 51 carried by springs 47 and 48, respectively. It will be assumed that plate 45 is grounded, that the incoming line is connected to spring 46, and that the switchboard equipment is connected to spring 48. Hence, the current flow between the line and the switchboard equipment passes over a series circuit including spring 46, terminal 35, heat coil 37, terminal 34, the forward portion of spring 47, clip 50, fuse 49, clip 51, and spring 48.

A voltage surge on the line will raise the potential of the bi-metallic member and thereupon discharge to ground, creating an arc between contact 39 and the block 44. The heat generated by the arc in the enclosed discharge chamber formed by recess 42 and the block 44 will cause the bi-metallic member to flex until contact 39 engages block 44, thereby extinguishing the arc and grounding the line. It will be seen, too, that if the current flow between the line and switchboard equipment increases materially above its normal value, the additional heat generated by the coil 37 will flex the bi-metallic member and ground the line, even though no arc is created. The switchboard is further protected in Fig. 1 by fuse 49 which will blow if subjected to too high a current. The fuse may be omitted, if desired, in which case the switchboard equipment will be connected directly to spring 47 instead of spring 48. If this is done, it will be self-evident that the fuse clip 50 need not be provided on the spring 47, and the spring 48 may be omitted altogether, whereby the mounting arrangement will consist of the mounting plate 45 and springs 46 and 47 only, mounted thereon.

When the protector is mounted as shown in Figs. 1 and 2, the longitudinal axis of the gravity locking pin 43 is vertical, as illustrated in Figs. 5, 6 and 7. So long as the bi-metallic member occupies its normal position flat upon the bottom of recess 32, it supports the gravity locking pin in the position in which the latter is shown in Fig. 6. If, however, due either to an over-voltage or an over-current, the bi-metallic member flexes and hence grounds the line as described, it permits the pin to drop by gravity to the position in which it is shown in Fig. 7. In so doing, the upper cone-shaped end of the pin wedges behind the element 38 and prevents the same from restoring, thus to maintain the line grounded until the cause of the protector's operation has been investigated. After the trouble has been cleared, the attendant may return the line to service by slipping the protector out of its place in the mounting frame, manually resetting the locking pin to normal and then slipping the protector back in place under springs 46 and 47.

The protector may at any time be converted into a self-restoring device by removing the gravity locking pin before mounting it in the frame. When used without the pin, the bi-metallic member 38 will, after operating, remain operated no longer than is necessary for adequate protection of the line. In other words, as soon as it cools, element 38 will restore to normal and thereby disconnect ground from the line, no manual resetting being necessary.

Having described this invention, what is considered new and is desired to be protected by Letters Patent is set forth in the following claims.

What is claimed is:

1. In a device for protecting electrical circuits against abnormal currents and abnormal voltages, a removable unit comprising a block of insulating material, a recess therein, a heating element in said recess, a second recess in said block, a bi-metallic electrode positioned in said second recess and completely enclosing said first recess, another electrode completely closing the opening of said second recess, abnormal current through said element or abnormal voltage between said electrodes causing said bi-metallic electrode to bend and contact said other electrode, and a lock free of attachments to any of the elements of said device and positioned in said second recess and moved by gravity in response to said bi-metallic electrode contacting said other electrode to maintain said electrodes in engagement after closure thereof.

2. In a device for protecting electrical circuits against abnormal currents and abnormal voltages, a removable unit comprising a block of insulating material, a recess therein, a heating element enclosed in said recess, a second recess in said block, a bi-metallic electrode enclosed in said second recess, a gravity operated locking pin normally maintained in a certain position by said bi-metallic electrode, another electrode closing the opening of said second recess forming a substantially enclosed chamber, abnormal current through said element or abnormal voltage between said electrodes causing said bi-metallic electrode to bend and contact said other electrode, said locking pin thereupon moving axially in a direction transverse to the length of said bi-metallic electrode, a wedge shaped portion on said pin then effective to prevent said bi-metallic electrode from returning to its normal position, thereby maintaining said electrodes in contact.

3. In a device for protecting electrical circuits against abnormal currents and abnormal voltages, a removable unit comprising a block of insulating material, a recess therein, a heating element enclosed in said recess, a second recess in said block, a bi-metallic electrode enclosed in said second recess, a wedge member free of attachments to any of the elements of said device and normally maintained in a certain position by said bi-metallic electrode, another electrode closing the opening of said second recess, abnormal current through said element or abnormal voltage between said electrodes causing said bi-metallic electrode to bend and contact said other electrode, thereby closing a protective electrical circuit, said wedge member thereupon moved by gravity to change its position in such a way as to prevent said bi-metallic electrode from returning to its normal position, thereby maintaining said protective electrical circuit.

4. In a device for protecting an electrical circuit, a removable unit comprising an insulating block, a heater coil, a bi-metallic electrode and a locking device free of attachments to any of the elements of said protecting device enclosed in said block by a second electrode, said unit mounted between the conductors of said electrical circuit, said heater coil heating said bi-metallic electrode thereby causing said bi-metallic electrode to move and close a protective electrical circuit including said electrodes, said locking device moved by gravity in response to the movement of said bi-metallic electrode to maintain said protective circuit closed.

5. In a device for protecting an electrical circuit, a removable unit mounted between the two conductors of said electrical circuit, said unit comprising an insulated block, a bi-metallic electrode and a locking device free of attachments to any of the elements of said protecting device, said elements enclosed in said insulated block by a second electrode, means for moving said bi-metallic electrode into contact with said second electrode, said locking device moved by gravity in response to the movement of said bi-metallic electrode for latching said electrodes in contact, thereby maintaining a short circuit across said electrical circuit.

6. In an electrical circuit a removable device for short circuiting said circuit, said device comprising an insulating block, a bi-metallic electrode, a gravity operated locking pin normally maintained in a certain position by said bi-metallic electrode, said elements enclosed in said insulating block by a second electrode, said device completing a connection across said electrical circuit upon movement of said bi-metallic electrode into contact with said second electrode, said locking pin thereby moved axially in a direction transverse to the length of said bi-metallic electrode, and a wedge shaped portion on said pin then effective to prevent said bi-metallic electrode from returning to its normal position, thereby maintaining said connection.

ROY G. SANDS.

REFERENCES CITED

The following references are of record in the file of this patent:

UNITED STATES PATENTS

| Number | Name | Date |
| --- | --- | --- |
| 433,744 | Sargent | Aug. 5, 1890 |
| 1,223,117 | Schaf | Apr. 17, 1917 |
| 1,373,128 | Freese | Mar. 29, 1921 |
| 1,980,756 | Hoover | Nov. 13, 1934 |
| 2,124,364 | Brach | July 19, 1938 |
| 2,141,490 | Sands | Dec. 27, 1938 |
| 2,168,769 | Fisher | Aug. 8, 1939 |
| 2,271,813 | Clayton, Jr. | Feb. 3, 1942 |